United States Patent
Handing

(10) Patent No.: US 9,975,506 B2
(45) Date of Patent: May 22, 2018

(54) IMPACT BEAM FOR A MOTOR VEHICLE AND METHOD FOR PRODUCTION THEREOF

(71) Applicant: BENTELER AUTOMOBILTECHNIK GMBH, Paderborn (DE)

(72) Inventor: Christian Handing, Lagenberg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days. days.

(21) Appl. No.: 15/245,972

(22) Filed: Aug. 24, 2016

(65) Prior Publication Data
US 2017/0129429 A1    May 11, 2017

(30) Foreign Application Priority Data
Aug. 25, 2015 (DE) .................. 10 2015 114 105

(51) Int. Cl.
*B60R 19/03* (2006.01)
*B60R 19/18* (2006.01)
*B60R 19/02* (2006.01)

(52) U.S. Cl.
CPC ............ *B60R 19/18* (2013.01); *B60R 19/023* (2013.01); *B60R 19/03* (2013.01)

(58) Field of Classification Search
CPC .... B01D 27/08; B01D 35/147; B01D 27/103; B01D 35/15; B61D 45/007; C08L 83/04; C08L 2666/54; A47G 27/0456; B65D 2301/10; B65D 2585/366
USPC ......................................................... 293/120
See application file for complete search history.

(56) References Cited

U.S. PATENT DOCUMENTS

| | | | | |
|---|---|---|---|---|
| 5,722,708 A | * | 3/1998 | Jonsson .................. | B60R 19/18 293/102 |
| 5,997,058 A | | 12/1999 | Pedersen | |
| 7,007,989 B2 | * | 3/2006 | Yoon ....................... | B60R 19/18 293/120 |
| 7,066,508 B1 | * | 6/2006 | Baccouche ............. | B60R 19/18 293/120 |
| 7,210,717 B1 | * | 5/2007 | Baccouche ............. | B60R 19/18 293/102 |
| 7,425,123 B2 | | 9/2008 | Gouillart et al. | |

(Continued)

FOREIGN PATENT DOCUMENTS

| | | |
|---|---|---|
| DE | 100 44 409 | 4/2002 |
| DE | 603 01 916 | 7/2006 |

(Continued)

*Primary Examiner* — Kiran B Patel
(74) *Attorney, Agent, or Firm* — Henry M. Feiereisen LLC

(57) ABSTRACT

An impact beam for a motor vehicle, said impact beam includes a front wall, a rear wall and at least two transverse walls connecting the front wall and the rear wall. The front wall has a single-layered section and a multilayered section, wherein the multilayered section is formed by a first and a second front wall section, wherein the first front wall section is fixedly connected with the second front wall section, wherein at least the single-layered front wall section, the rear wall and the at least two transverse walls together enclose a hollow chamber. The front wall, the rear wall and the transverse walls are configured in one-piece and of a same material, wherein the impact beam is made of a longitudinal starting section with a constant U-shaped cross section.

10 Claims, 13 Drawing Sheets

(56) References Cited

U.S. PATENT DOCUMENTS

| | | |
|---|---|---|
| 7,823,939 B2 | 11/2010 | Handing et al. |
| 7,896,412 B2 | 3/2011 | Wang et al. |
| 8,020,907 B2 | 9/2011 | Wibbeke et al. |
| 8,043,681 B2 | 10/2011 | Handing et al. |
| 8,201,861 B2 | 6/2012 | Handing et al. |
| 8,360,490 B2 | 1/2013 | Handing et al. |
| 8,419,091 B2 | 4/2013 | Roll et al. |
| 8,544,905 B2 | 10/2013 | Handing et al. |
| 8,622,446 B2 | 1/2014 | Handing et al. |
| 9,057,114 B2 | 6/2015 | Pellmann et al. |
| 9,187,054 B2 | 11/2015 | Handing et al. |
| 2004/0130166 A1* | 7/2004 | Trancart ............... B60R 19/18 293/102 |
| 2008/0083498 A1 | 4/2008 | Handing |
| 2008/0093867 A1 | 4/2008 | Glasgow et al. |
| 2008/0224487 A1 | 9/2008 | Wang et al. |
| 2009/0045638 A1 | 2/2009 | Handing et al. |
| 2009/0236163 A1 | 9/2009 | Wibbeke et al. |
| 2009/0243312 A1 | 10/2009 | Handing et al. |
| 2011/0232806 A1 | 9/2011 | Pellmann et al. |
| 2011/0233946 A1 | 9/2011 | Pellmann et al. |
| 2011/0233966 A1 | 9/2011 | Pellmann et al. |
| 2011/0233968 A1 | 9/2011 | Pellmann et al. |
| 2012/0104779 A1 | 5/2012 | Handing et al. |
| 2012/0270060 A1 | 10/2012 | Wibbeke et al. |
| 2014/0033791 A1* | 2/2014 | Johnson ................ B21D 5/086 72/379.2 |
| 2014/0361558 A1* | 12/2014 | Malkowski ............ B60R 19/18 293/102 |
| 2015/0097384 A1 | 4/2015 | Conrod |
| 2015/0102613 A1* | 4/2015 | Johnson ................ B60R 19/18 293/102 |
| 2015/0307045 A1* | 10/2015 | Matecki ............... B60R 19/023 293/122 |
| 2017/0073788 A1* | 3/2017 | Kim ....................... B21D 47/01 |
| 2017/0136971 A1* | 5/2017 | Suzumori ............ B60R 19/023 |
| 2017/0274851 A1* | 9/2017 | Schneider ............ B60R 19/18 |
| 2017/0361793 A1* | 12/2017 | Matecki ................... E04C 3/06 |

FOREIGN PATENT DOCUMENTS

| | | |
|---|---|---|
| DE | 11 2007 002 534 | 12/2009 |
| DE | 10 2010 050 013 | 5/2012 |
| EP | 0 876 265 | 8/2002 |

\* cited by examiner

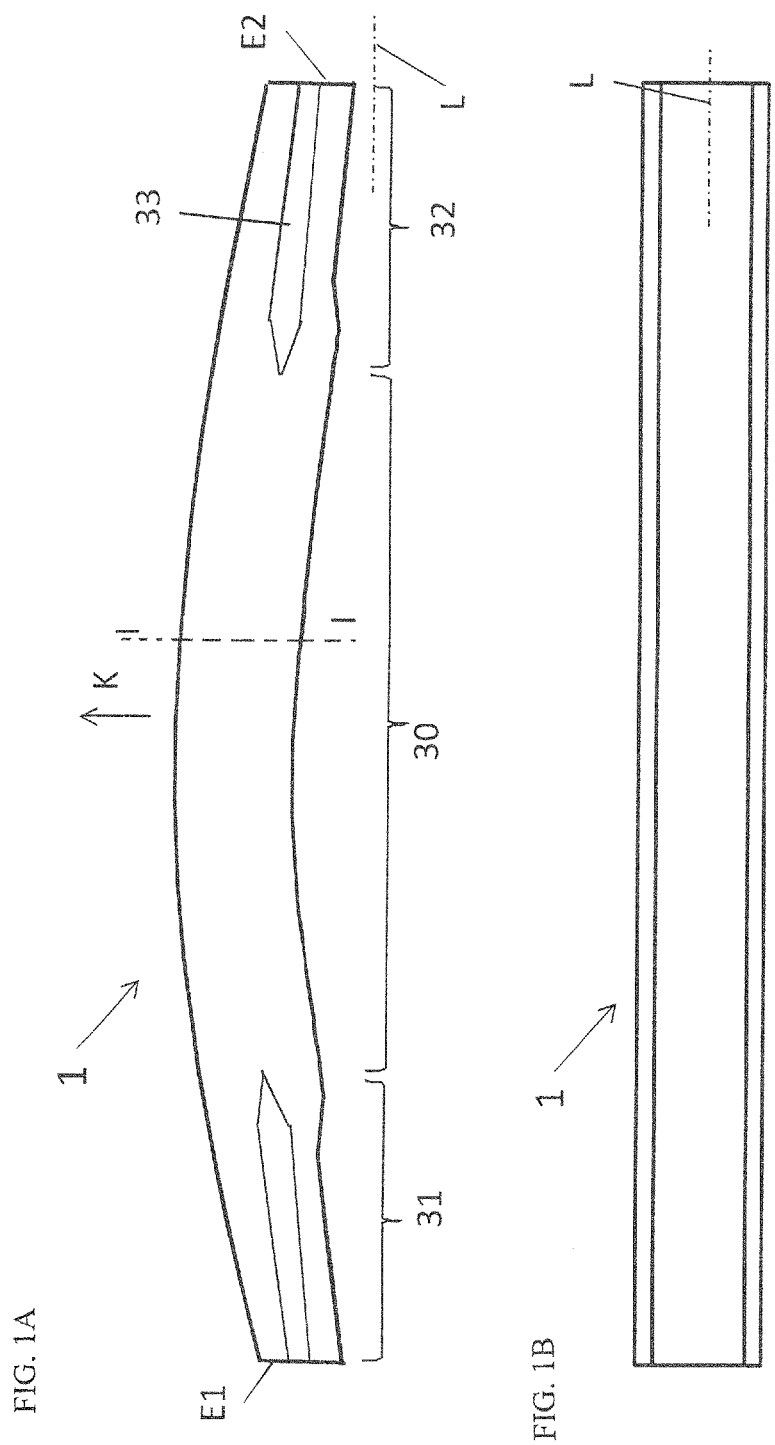

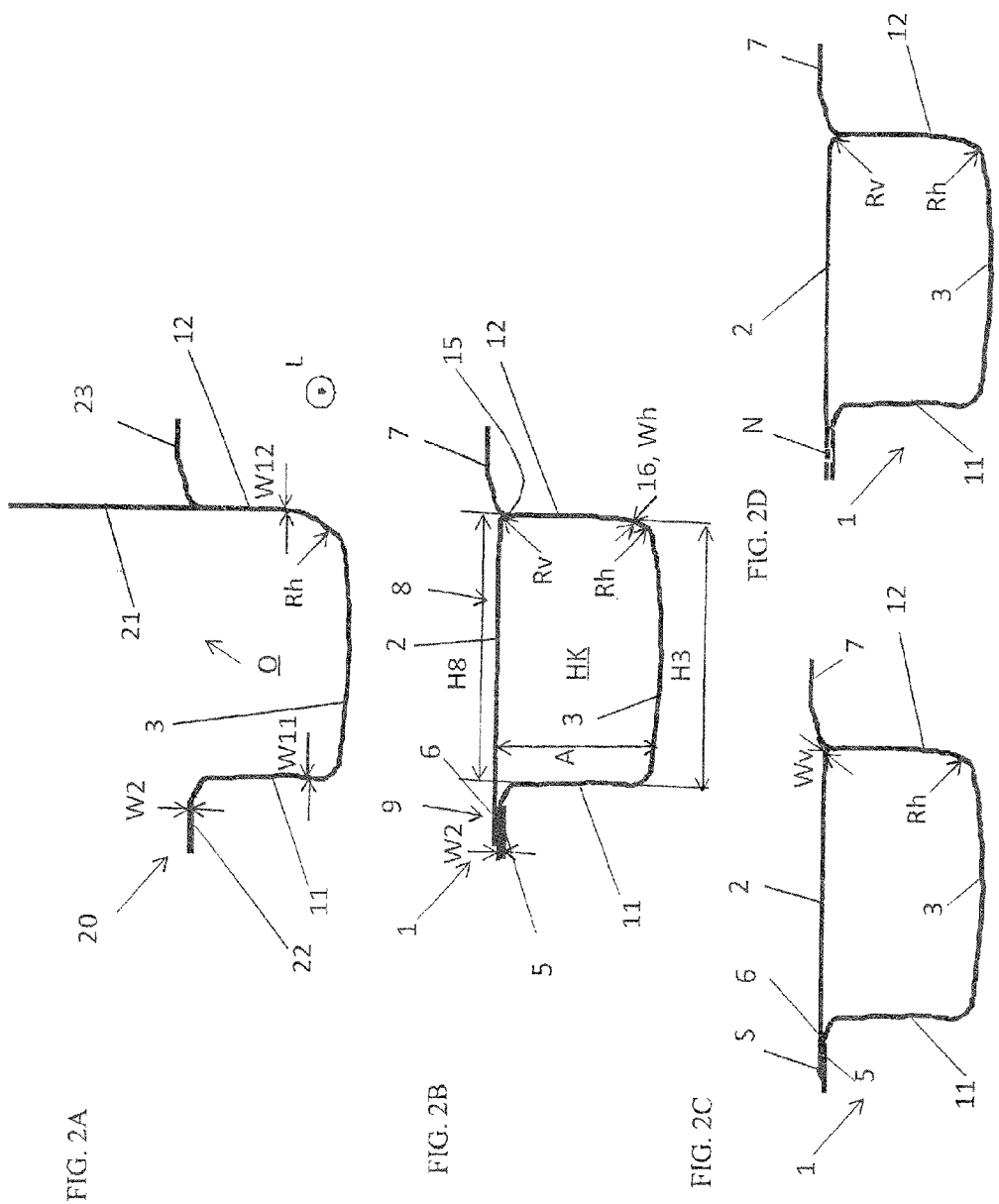

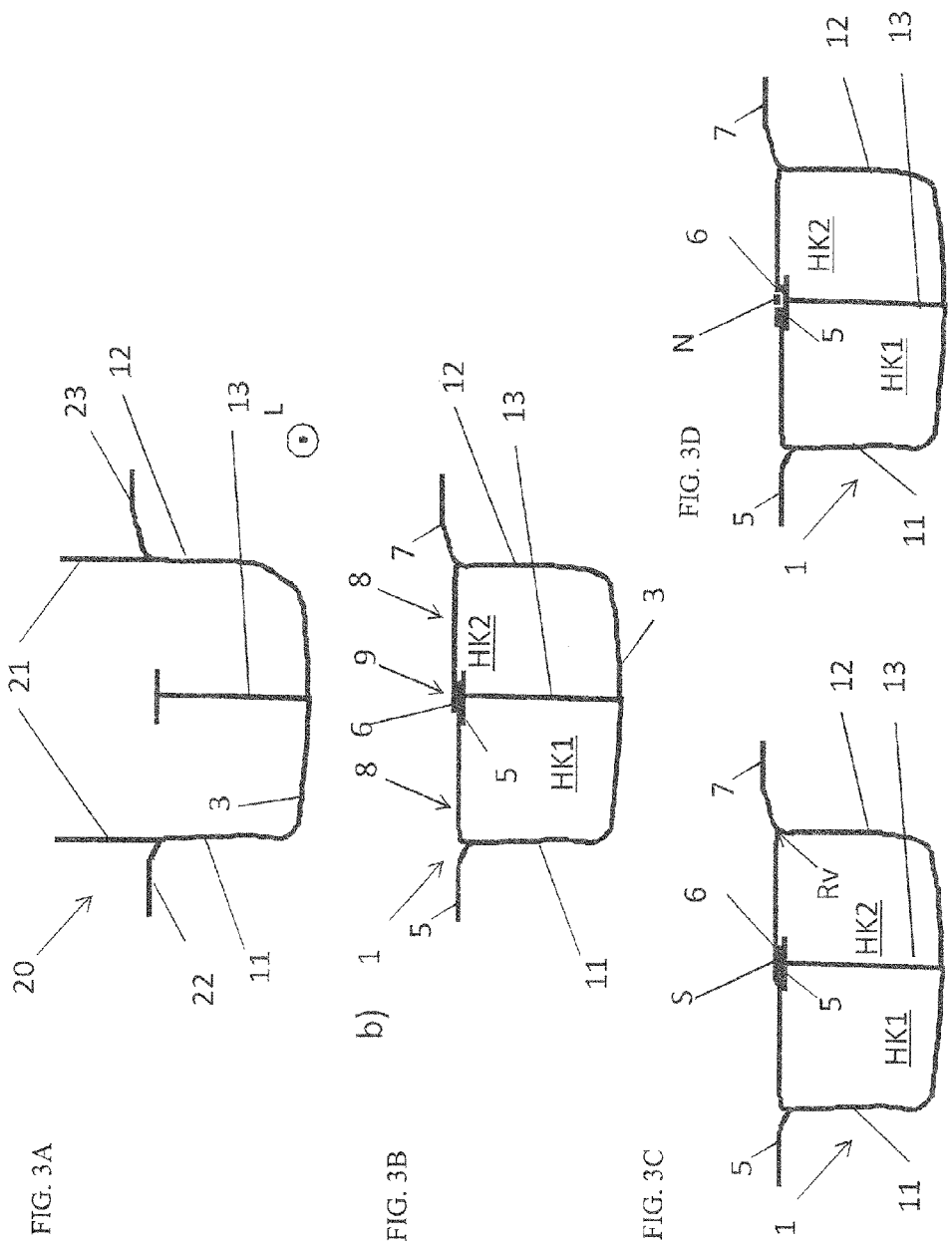

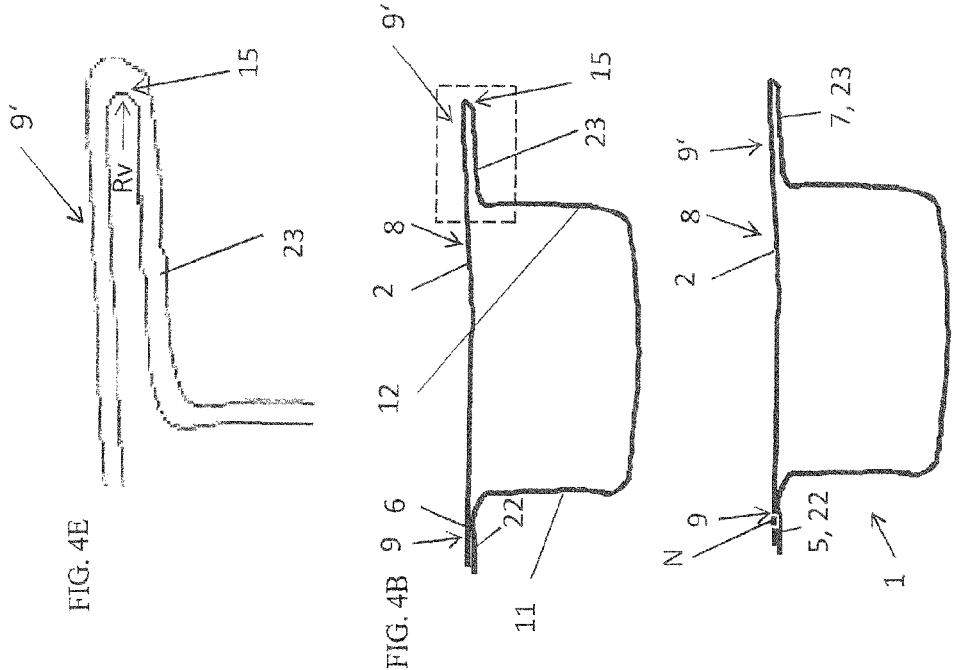

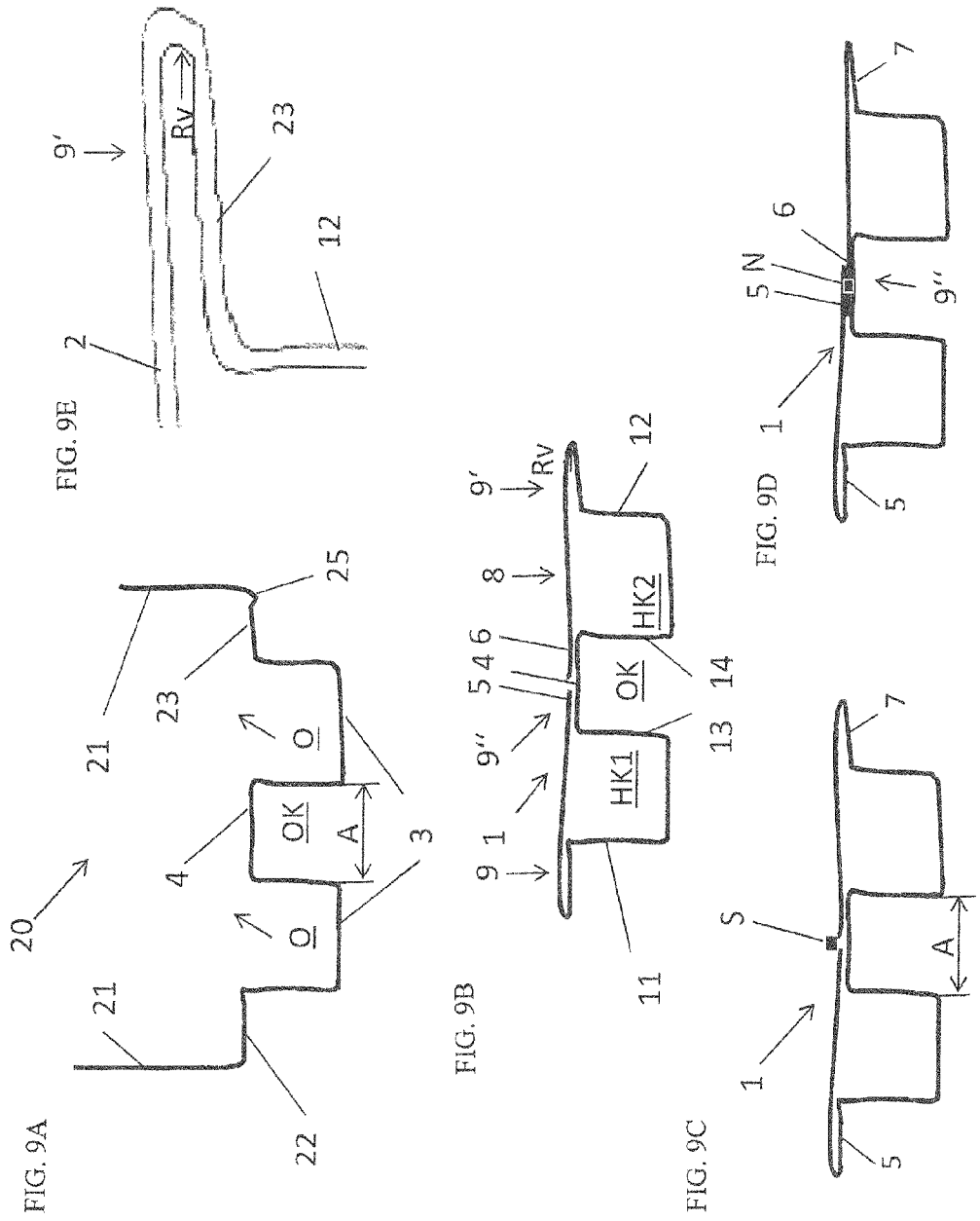

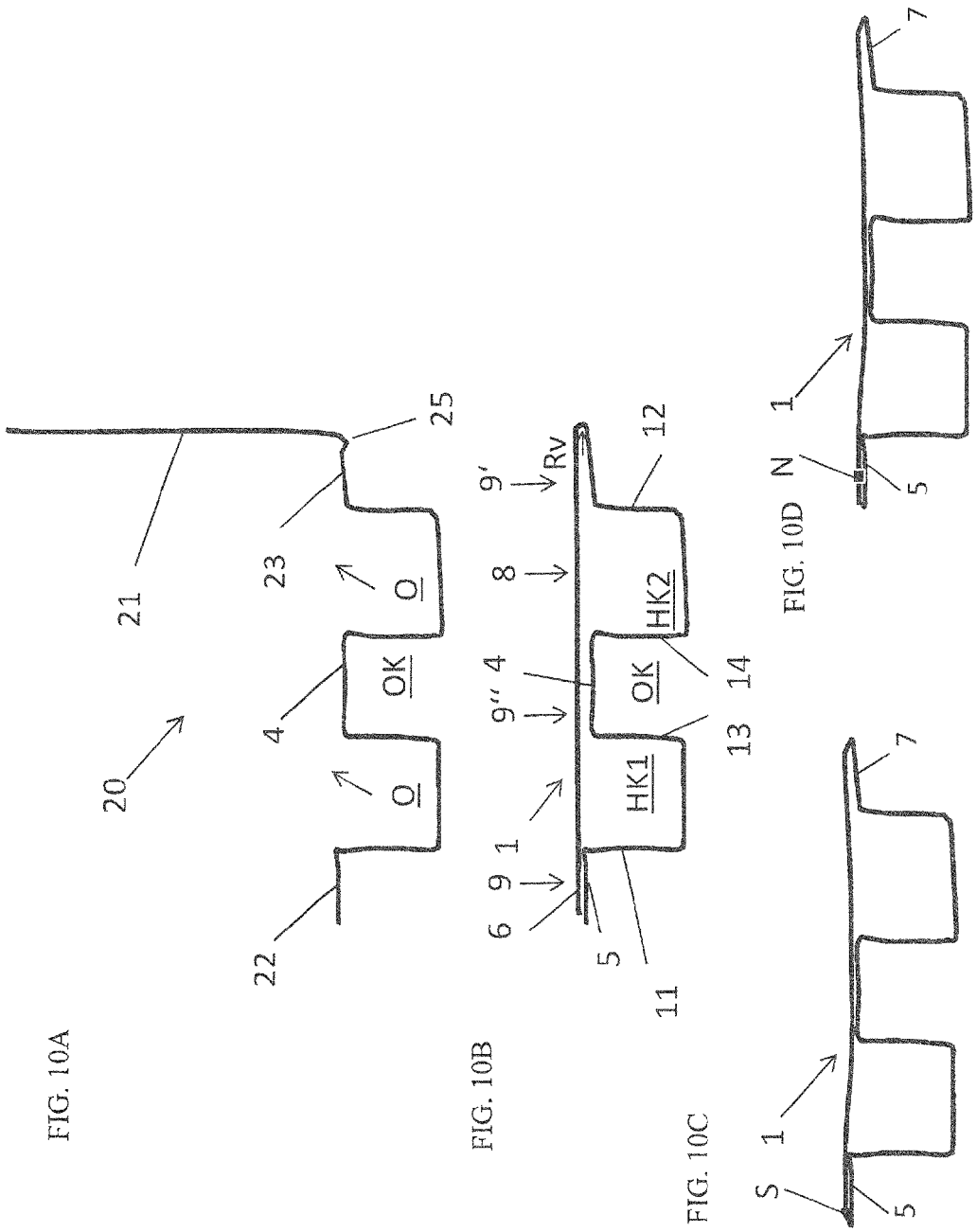

ial No. 10 2015 114 105.1, filed Aug. 25,
IMPACT BEAM FOR A MOTOR VEHICLE AND METHOD FOR PRODUCTION THEREOF

CROSS-REFERENCES TO RELATED APPLICATIONS

This application claims the priority of German Patent Application, Serial No. 10 2015 114 105.1, filed Aug. 25, 2015, pursuant to 35 U.S.C. 119(a)-(d), the disclosure of which is incorporated herein by reference.

BACKGROUND OF THE INVENTION

The invention relates to an impact beam for a motor vehicle and method for production of an impact beam.

The following discussion of related art is provided to assist the reader in understanding the advantages of the invention, and is not to be construed as an admission that this related art is prior art to this invention.

The document U.S. Pat. No. 8,201,861 B2 discloses for example an impact beam as bumper made of an aluminum section, wherein a front wall, a rear wall and three transverse walls, which connect the front wall and the rear wall, enclose two hollow chambers. The impact beam is made of an extruded section.

The document DE 10 2010 050 013 A1 discloses an impact beam as bumper for a motor vehicle made of an extruded main part with a top-hat shaped cross section, and a front part which closes the main part. Both parts are interconnected by welding so as to overlap with each other. A disadvantage is the plurality of required parts that correspondingly require positioning means during production and also tolerance problems.

The documents DE 11 2007 002 534 T5, DE 603 01 916 T2, DE 100 44 409 A1 and U.S. Pat. No. 2,015,097 384 A11 disclose impact beams as bumpers for a motor vehicle, which are formed by roll-forming from a sheet metal band into a closed section, thereby forming two or more hollow chambers. A special configuration of the front wall and/or the rear wall, either in the form of ribs extending in longitudinal direction, in form of an additional hollow chamber in the front wall or in the form of concavities on the rear side can increase bending stiffness and energy absorption in the event of an impact. The document EP 0 876 265 B1 describes an impact beam as bumper for a motor vehicle, wherein a front wall, a rear wall and two transverse walls which connect the front wall and the rear wall are produced in one piece and from the same material from lightweight metal directly by extrusion so as to enclose a hollow chamber. The rear wall has hereby a greater wall thickness, wherein a cross sectional course varies along the length of the impact beam and is adapted to the load requirements.

A disadvantage is that in the case of extrusion into the section having the extruded hollow chamber production speeds have to be un-proportionally lowered with increasing strength of the aluminum alloy. The cooling of the tool is so costly that increasing demands on the lightweight construction are no longer economically feasible.

It would therefore be desirable and advantageous to provide impact beams made of lightweight metal with improved lightweight properties and low production complexity.

SUMMARY OF THE INVENTION

According to one aspect of the present invention, an impact beam for a motor vehicle, said impact beam includes a front wall, a rear wall extending at least in sections parallel and at a distance to the front wall and at least two transverse walls which connect the front wall and the rear wall, wherein the front wall has a single-layered front wall section and a multilayered front wall section, wherein the multilayered front wall section is formed by a first front wall section and a second front wall section, wherein the first front wall section is fixedly connected with the second front wall section, wherein at least the single-layered front wall section, the rear wall and the at least two transverse walls together enclose a hollow chamber, wherein the front wall, the rear wall and the transverse walls are configured in one-piece and of a same material, the rear wall and the transverse walls having a yield strength RP0.2 between 300 MPa and 550 MPa, the impact beam being made of a longitudinal starting section with a constant U-shaped cross section, wherein the U-shaped cross section of the starting section forms the rear wall and the at least two transverse walls of the impact beam at least in a longitudinal section of the impact beam.

In spite of the used ultra-high-strength aluminum alloy, as expressed in the yield strength, a one-piece impact beam can thus be provided which satisfies the modern demands on component weight, stability, corrosion resistance and recyclability as well as economic manufacturability in large numbers.

The impact beam is made from a longitudinal starting section with a constant U-shaped cross section, wherein this U-shaped section cross section at least in a longitudinal section of the impact beam forms the rear wall and the at least two transverse walls of the impact beam. This results in a folding stiff beam which when used as crash-relevant vehicle part prevents crash obstacles from entering the passenger compartment and at the same time reduces or absorbs impact energy by targeted deformation.

Within the scope of the invention the term U-shaped cross section also means a top-hat shaped or asymmetrical cross section, as well as cross sections that beside a rear wall have more than two transverse walls protruding therefrom. Important according to the invention is only that a rear wall and at least two transverse walls perpendicularly protruding therefrom are configured U-shaped and form a continuous folding stiff contour of the starting section. Hereby it can be provided that between the single-layered front wall section and a transverse wall adjoining the single-layered front wall section a front wall curvature with a first radius is formed and between the rear wall and a transverse wall a rear wall curvature with a second radius is formed. The radius of the rear wall curvature is smaller than the radius of the front wall curvature by at least 20 percent. Particularly preferably the radius of the rear wall corresponds maximally to twice the wall thickness in the region of the rear wall curvature.

As an alternative or in addition the deformability is ensured by a predetermined folding site arranged in the region of the wall curvature in the starting section. This enables a folding or angling by a very small radius. In the simplest case the predetermined folding site is a groove that is formed in the starting section along a subsequent folding line.

According to another advantageous feature of the invention, a front wall curvature with a radius is formed between the first front wall section and the third front wall section, and a rear wall curvature with a radius is formed between the rear wall and a transverse wall. Hereby the radius of the rear wall curvature is smaller than the radius of the front wall curvature by at least 20 percent. In particular the radius of the rear wall curvature corresponds maximally to twice the wall thickness of the rear wall curvature. The rear wall curvature in the starting section hardly changes in the finished impact beam and is significantly smaller, which has a positive effect on the stability of the impact beam in general and on the resistance against folding open of the U-section in case of a crash-related impact in particular.

According to another advantageous feature of the invention, the starting section is ideally an open extruded section, wherein the front wall of the impact beam is formed by a front wall stub of the starting section and has at least in sections an increased wall thickness relative to the wall thickness of a transverse wall. The configuration of the wall curvature with reduced wall thickness facilitates local plastic deformability during production of the impact beam in particular when folding the front wall stub over.

According to another advantageous feature of the invention, the starting section can be an open extruded section with an opening, wherein the opening of the extruded section is arranged on the side facing away from the rear wall and is delimited by the outer transverse walls.

According to another advantageous feature of the invention, the impact beam according to the invention can be made of an ultra-high-strength aluminum alloy, in particular selected from the following group of aluminum alloys according to EN-573-4: 6013, 6065 and 6082 and 7020, 7022, 7046, 7075, 7108 and 7349, and 2014, 2195 and 2196. These aluminum alloys and alloys that are materially related provide an optimal lightweight construction.

According to another advantageous feature of the invention, the front wall can have a yield strength Rp0.2 in a front wall section and/or in a front wall curvature between the first front wall section and a third front wall section between 150 and 300 MPa and/or a wall thickness smaller than or equal to (<=) 3 millimeters. This can be achieved by a locally different heat treatment of the starting profile prior to the folding over of the front wall stub or during the folding over at hot forming temperature.

According to another advantageous feature of the invention, an inner transverse wall can be formed essentially protruding perpendicularly from the rear wall between the outer transverse walls, when viewed in cross section, and separates the hollow chamber into two sub chambers.

According to another advantageous feature of the invention, the inner transverse wall of the starting section is Y-shaped in cross section with a stem which extends perpendicular to the rear wall and two branches that extend away from each other from the stem, wherein the branches are configured as front wall stub and each forms a double layered front wall section and a single-layered front wall section of the front wall by folding the branches in opposite direction in the direction of the transverse walls. With this a particularly simple extruded starting section is realized which can be formed easily, in particular in a single folding step, into the finished cross sectional configuration of the impact beam.

According to another advantageous feature of the invention, the inner transverse wall is T-shaped in cross section and at least one front wall section is fastened thereon. Also two front wall sections can be fastened thereon by folding over two front wall sections. The term folding over in the context of the invention means a plastic deformation substantially about a folding axis parallel to the longitudinal axis of the impact beam. This is for example possible by means of angling.

It is also possible that two inner transverse walls protrude substantially perpendicular from the rear wall and are arranged at a distance to each other, wherein the inner transverse walls together with the front wall form a chamber which is open in the direction of the rear wall. This increases folding stiffness but also the weight of the impact beam.

According to another aspect of the invention, a method for producing an impact beam includes providing a starting section as an open, extruded section having a U-shaped cross section, wherein the starting section has a rear wall, two transverse walls protruding perpendicularly from the rear wall in a same direction, an opening delimited by the transverse walls and a front wall stub facing away from the rear wall; folding the front wall stub so as to form a front wall of the impact beam which closes the opening, thereby forming a hollow chamber which is delimited by the rear wall, the transverse walls and a single-layered front wall section of the front wall, wherein during the folding a first front wall section is at least brought in proximity to a second front wall section; fixedly connecting the first front wall section with the second front wall section.

The folding can be performed by angling or bending in particular by means of a pressing tool in one or more stages.

As an alternative the folding is performed in the continuous throughput method by means of multiple roller sets that are arranged in longitudinal direction of the extruded section or the starting section, i.e., in multiple steps.

It is also advantageous when a curvature transverse to the longitudinal direction of the impact beam and/or an embossment is introduced into an end section in order to follow the vehicle design or in order to positively influence the deformation behavior.

The method is in particular suited to produce impact beams as described above.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1A shows a top view onto an impact beam according to the invention.

FIG. 1B shows a front view of an impact beam according to the invention.

FIGS. 2A-2D show cross sectional views of an embodiment of the impact beam according to the invention taken along section I-I of FIG. 1A;

FIGS. 3A-3D show cross sectional views of another embodiment of the impact beam according to the invention taken along section I-I of FIG. 1A;

FIGS. 4A-4E show cross sectional views of another embodiment of the impact beam according to the invention taken along section I-I of FIG. 1A;

FIGS. 9A-9E show cross sectional views of another embodiment of the impact beam according to the invention taken along section I-I of FIG. 1A;

FIGS. 10A-10D show cross sectional views of another embodiment of the impact beam according to the invention taken along section I-I of FIG. 1A;

DETAILED DESCRIPTION OF PREFERRED EMBODIMENTS

Figure 5A:
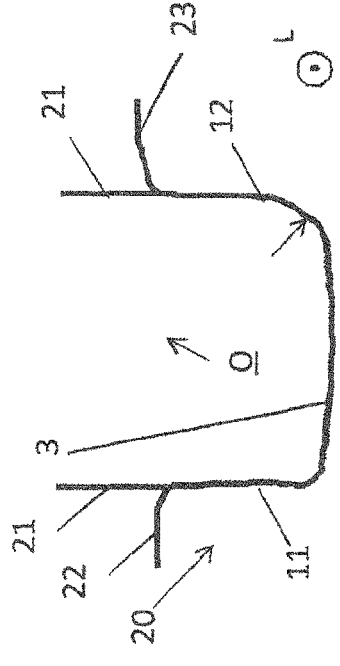
FIGS. 5A-5D show cross sectional views of another embodiment of the impact beam according to the invention taken along section I-I of FIG. 1A.
Figure 5B:
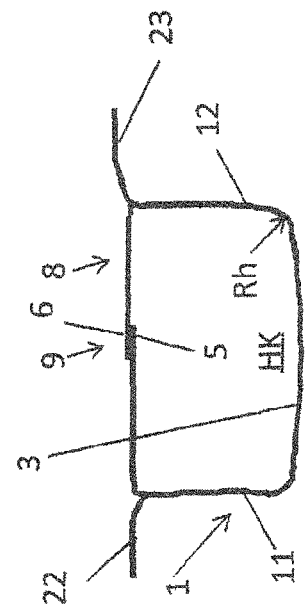
Figure 5C:
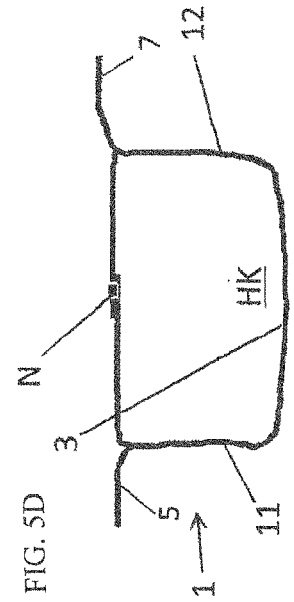
Figure 5D:
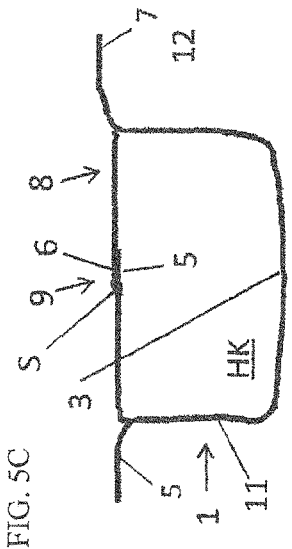
Figure 6A:
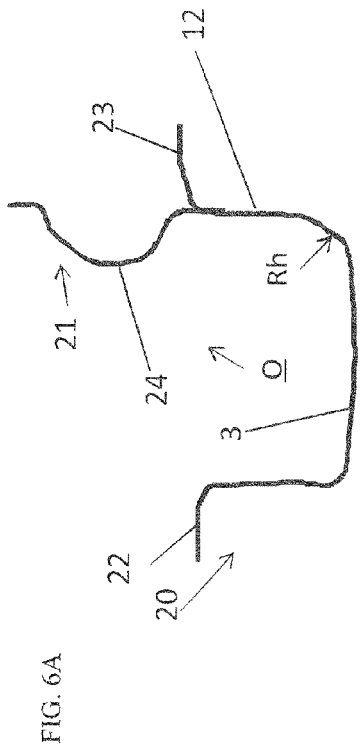
FIGS. 6A-6D show cross sectional views of another embodiment of the impact beam according to the invention taken along section I-I of FIG. 1A.
Figure 6B:
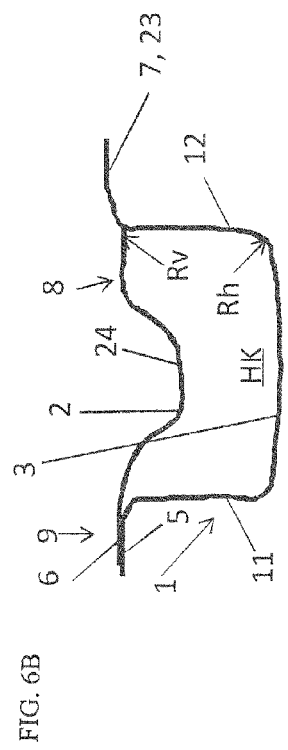
Figure 6D:
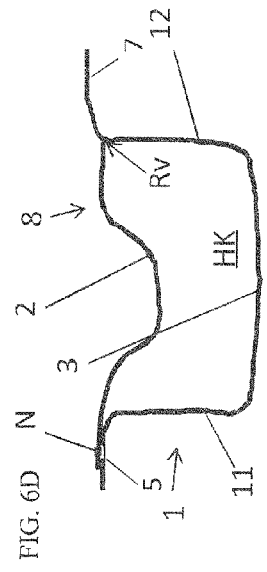
Figure 6C:
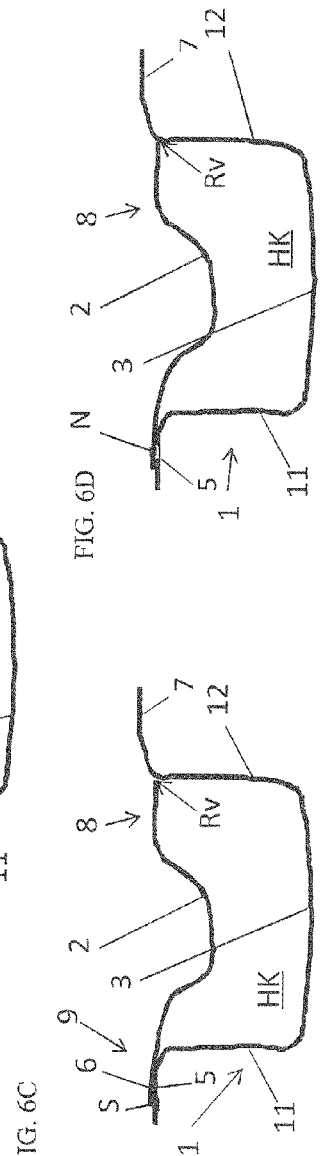
Figure 7A:
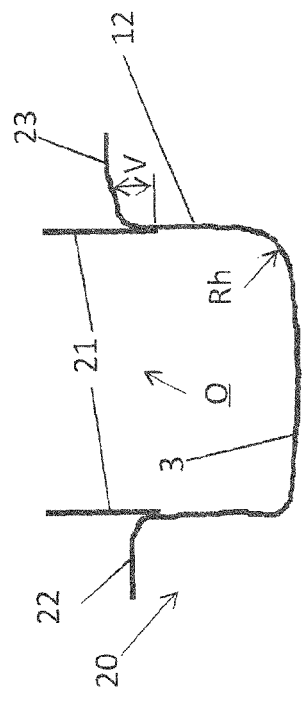
FIGS. 7A-7D show cross sectional views of another embodiment of the impact beam according to the invention taken along section I-I of FIG. 1A.
Figure 7B:
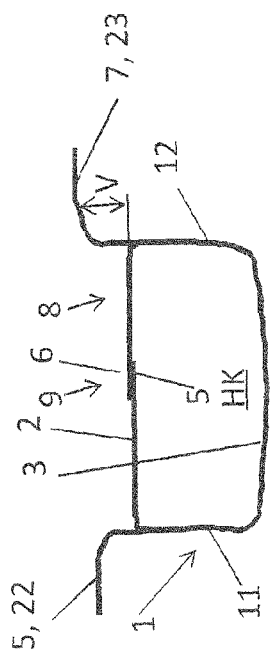
Figure 7D:
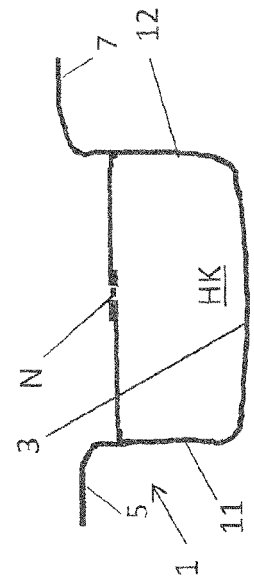
Figure 7C:
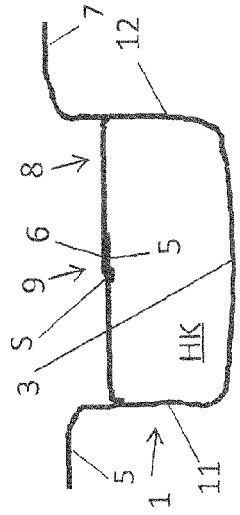
Figure 8A:
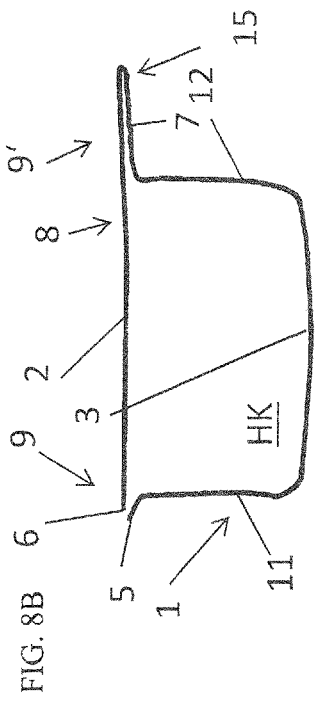
FIGS. 8A-8D show cross sectional views of another embodiment of the impact beam according to the invention taken along section I-I of FIG. 1A.
Figure 8B:
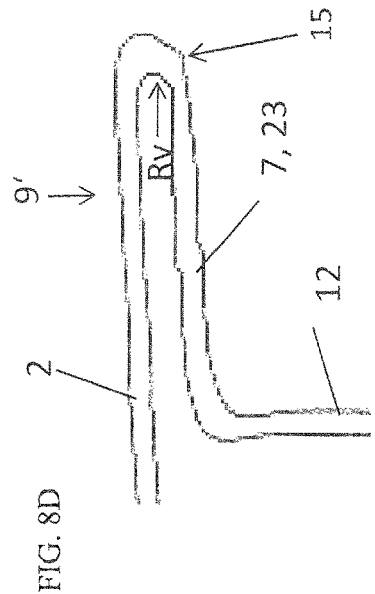
Figure 8C:
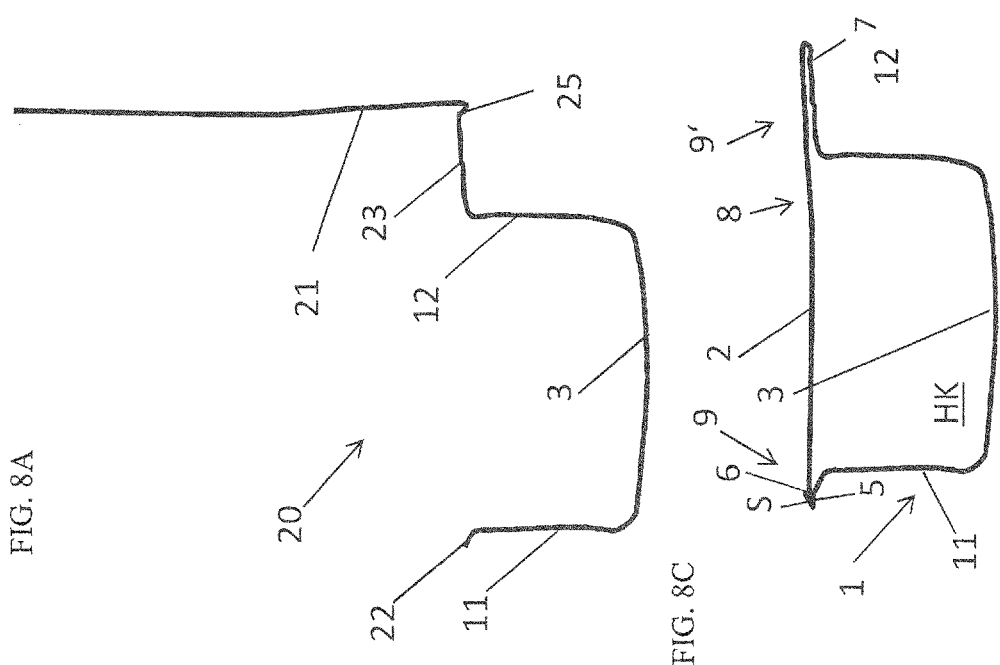
Figure 8D:
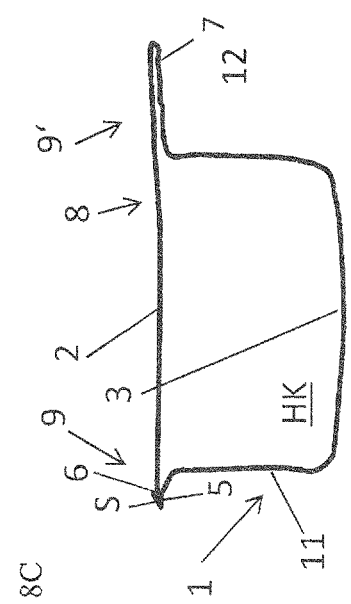
Figure 11A:
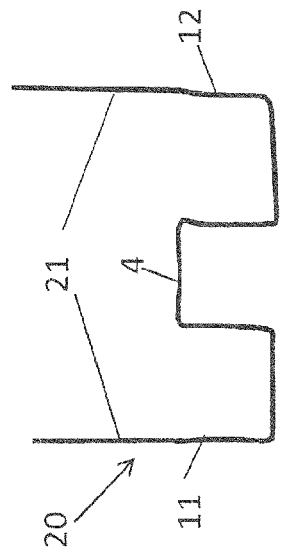
FIGS. 11A-11D show cross sectional views of another embodiment of the impact beam according to the invention taken along section I-I of FIG. 1A.
Figure 11B:
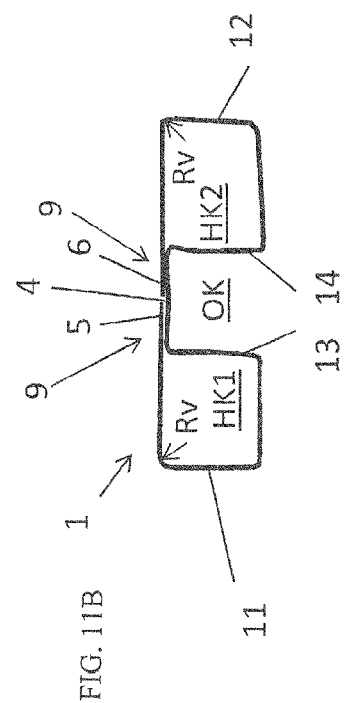
Figure 11C:
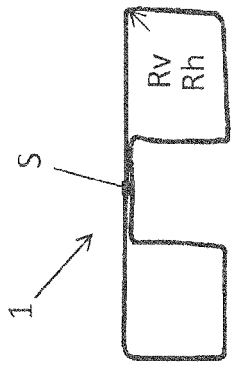
Figure 11D:
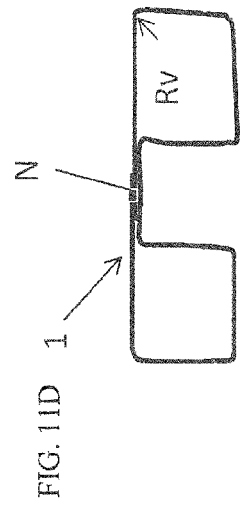
Figure 12A:
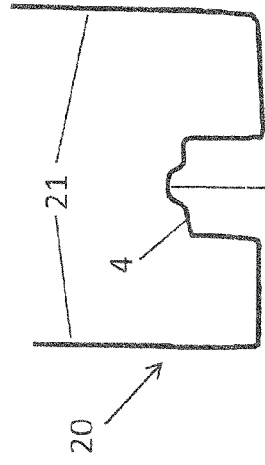
FIGS. 12A-12D show cross sectional views of another embodiment of the impact beam according to the invention taken along section I-I of FIG. 1A.
Figure 12B:
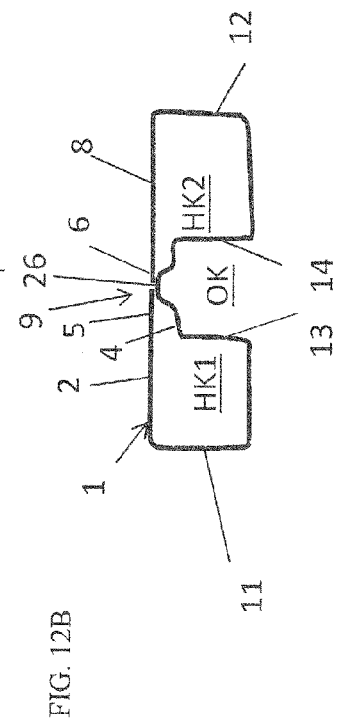
Figure 12C:
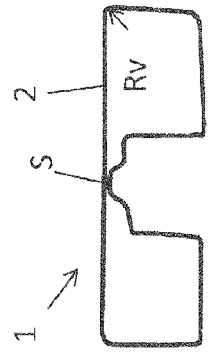
Figure 12D:
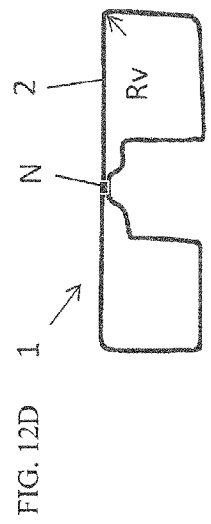

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1A shows a top view and FIG. 1B a front view of an impact beam 1 according to the invention. It can be seen that a slight curvature K is formed in its longitudinal direction L and two end sections 31, 32 and a middle section 30 extending between the end sections 31, 32 are provided. As can be seen in the top view of FIG. 1A the end sections 31, 32 extend toward the ends E1, E2 of the impact beam 1 and narrow in this direction. In the end sections 31, 32 embossments 33 are arranged, which can extend in longitudinal direction L or, as in the present case as a result of the curvature K of the impact beams, at an acute angle of smaller than 20 degrees to the longitudinal direction L.

Fur use as a bumper this can be advantageous when even connection surfaces or connection regions for connection to the vehicle structure, for example crash boxes, are required and/or the force level of the impact beam 1 in these connection regions is to be intentionally smaller than in the middle region 30.

For use as a door impact beam on the other hand an end section 31, 32 that becomes shallower may additionally or alternatively be required also due to space requirements at least at its end E1, E2.

The section I-I in FIG. 1A shows the approximate position of the cross sectional representations according to FIGS. 2 to 12.

FIGS. 2A-2D show a first embodiment of the invention in cross section. As in all embodiments explained below the impact beam 1 for a motor vehicle includes a front wall 2, a rear wall 3 oriented parallel and at a distance A to the front wall 2, and two transverse walls 11, 12 which connect the front wall 2 and the rear wall 3, wherein the front wall 2 the rear wall 3 and the transverse walls 11, 12 in the first embodiment enclose a hollow chamber HK.

As can be seen in FIGS. 2A and 2B the U-shaped starting section 20 with a U-shaped or top-hat shaped cross section is provided with a front wall stub 21, wherein the front wall stub 21 in FIG. 2b is inverted so that the single-layered front wall section 8 and a part of the multi-layered, here double layered-front wall section 9 of the impact beam 1 is formed therefrom. The flanges 22, 23 formed on the starting section 20 which point away from each other, remain unchanged in the finished formed impact beam 1 as first front wall section 5 and as third front wall section 7, as is the case in the embodiments described further below.

As in the other embodiments the front wall 2, the rear wall 3 and the two transverse walls 11, 12 of the impact beam 1 configured one-piece and of same material. The rear wall 3 and the transverse walls 11, 12 have a yield strength RP0.2 between 300 MPa and 550 MPa, wherein the front wall is formed double layered in sections with a first front wall section 5 and a second front wall section 6, wherein the first front wall section 5 is fixedly connected to the second front wall section 6. In FIG. 2C the fixed connection of the double layered front wall sections 9 are formed by a welding seam S while according to FIG. 2D an introduced welding rivet N forms the fixed connection. In the case of the welding seam S according to FIG. 2C it is possible that the latter is also formed as a so-called lockstitch seam, i.e., it is multiply interrupted along the longitudinal direction L of the impact beam.

Between the single-layered front wall section 8 and a transverse wall 12 adjoining thereon a front wall curvature 15 is formed with a radius Rv and between the rear wall 3 and this transverse wall 12, as in all following embodiments, a rear wall curvature 16 is formed with a radius Rh, wherein the radius Rh of the rear wall curvature 16 is smaller than the radius Rv of the front wall curvature 15 by at least 20 percent. Here the radius Rh of the rear wall curvature is maximally twice the single wall thickness Wh of the rear wall curvature 16 and the wall thickness Wh is at least in sections greater than 2 mm.

As in all embodiments the impact beam 1 is made of a longitudinal starting section 20 with a constant U-shaped cross section as shown in FIG. 2A. The U-shaped cross section of the starting section 20 forms in a longitudinal section of the impact beam the rear wall 3 and the two transverse walls 11, 12 of the impact beam.

Thus the starting section 20 is an open extruded section, wherein the front wall 2 has in sections an increased wall thickness W2 relative to the wall thickness W11, W12 of the transverse walls 11, 12. The increased wall thickness W2 is in this case formed in the first front wall section 5 and serves for the sufficient stable welding connection with the second front wall section 6.

The starting profile 20 is an open extruded section with an opening O, wherein the opening is formed so as to point away from the rear wall 3. In the case of use as front bumper of a motor vehicle the front wall 2 and the opening O face away form the vehicle in the direction of a potential obstacle.

The front wall 2 of the impact beam 1 preferably has a uniform yield strength in the range of the yield strength of the entire impact beam 1. As can be seen in FIGS. 2B-2D a single-layered front wall section 8 adjoins in cross section which front wall section substantially corresponds to the height H3 of the rear wall 3. In a front wall curvature 15 between the first front wall section 5 and a third front wall section 7 or flange 23 the yield strength is preferably RP0.2 between 150 and 300 MPa and/or the wall thickness is preferably Wv smaller than or equal to <=3 MM.

In the case of a cross section of the hollow chamber HK that increases in height toward the front wall 2 the height H8 of the single-layered front wall section 8 increases correspondingly. In other words in this case the rear wall 3 has in cross section a height H3, which at most corresponds to the height H8 of the single-layered front wall section 8. The total height H2 of the front wall 2 in this embodiment results from adding the height H8 of this single-layered front wall section 8 and the height of the flanges 22 and 23.

According to a second embodiment according to FIGS. 3A-3D the impact beam 1 includes in addition to the two outer transverse walls 11, 12 a third inner transverse wall 13, which is configured to protrude substantially perpendicular from the rear wall 3 and divides the hollow chamber of FIG. 2 into two sub chambers HK1, HK2. Regarding the features and reference numerals that are identical to the first embodiment, reference is made to the description of the first embodiment. FIG. 3A shows that the inner transverse wall 13 is already configured T-shaped in the open starting section 20, wherein at least one front wall section 5, 6 which is supported thereon (FIG. 3B) and according to FIG. 3C) is fastened thereon by means of the welding seam S or according to FIG. 3d) by means of the welding rivet N. As can be seen in FIGS. 3A and 3B the starting section 20 is provided with two front wall stubs 21, wherein the front wall stub in FIG. 3B are inverted so that from this together with the inner transverse wall 13 a multilayered, here three-layered front wall section 9 is formed. Adjoining thereon are single-layered front wall sections 8. The flanges 22, 23, which are formed on the starting section and point away from each other, remain unchanged in the finished formed impact beam 1. Via a front wall curvature 15 with the front radius Rv the transverse wall 11 or 12 transitions into the flange 22 or 23. The transverse wall 11, 12 transitions into the rear wall 3 with a radius Rh.

FIGS. 4A-4E show a third embodiment of the invention. Regarding the features and reference numerals that are identical with the first embodiment references is made to the description of the first embodiment. In contrast to the first embodiment in FIGS. 2A-2D in the starting section 20 a significantly longer front wall stub 21 is provided which, as shown well in FIGS. 4a and b is inverted by about 90 degrees in the direction of the opening O of the starting section 20 starting from the flange 23. The front wall stub 21 then forms the single-layered front wall section 8 in the impact beam 1 and two double layered front wall sections 9, 9' in the region of the flanges 22, 23 of the starting section 20. FIG. 4E shows an enlarged section of the double-layered front wall section 9' at the location where the front wall stub 21 was bent over to form the front wall 2. As shown in FIG. 4C and FIG. 4D it is again possible to fixedly connect the first front wall section 5 with the second front wall section 6 in the region of the flange 22.

In the starting section 20 a predetermined folding site 25 is provided in the region of the later front wall curvature 15, which predetermined folding site facilitates the inversion and ensures a most intimate connection between the front wall 2 and the flanges 22, 23. According to the embodiment according to FIGS. 4A-4E it is also possible however that in the double-layered front wall section 9' the yield strength Rp0.2 is between 150 and 300 MPa and/or the wall thickness W23 of the flange 23 is smaller than or equal to (<=3) millimeters mm. The multi-layered or double-layered front wall section 9' with the front wall curvature 15 and a front radius Rv can be seen in FIGS. 4B to 4E.

FIGS. 5A-5D show a fourth embodiment of the invention in cross section. This embodiment differs only from the second embodiment in that no inner transverse wall is formed. Rather the two front wall stub 21 of the starting section, as shown in FIGS. 4A and 4B, are inverted so that they contact each other about in the center of the opening O to form a double layer. As shown in FIGS. 5C and 5D again a fixed connection of he first front wall section 5 with the second front wall section 6 is accomplished by a welding seam S or welding rivets N. By means of a not shown internal support system the joining process can be positively influenced. Regarding the remaining features shown in FIGS. 5A-5D reference is made to the description of FIGS. 2A-2D.

The fifth embodiment according to FIGS. 6A-6D differs from the first embodiment only in that the front wall stub 21 is provided with a continuous depression 24 in the starting section 20 so that after the inversion of the front wall stub 21 the front wall 2 has a corresponding depression 24 in the longitudinal direction L of the impact beam 1. The depression 24 serves for stiffening against folding as well as for an increased and in particular enhanced energy absorption during crash-related deformation of the impact beam 1. After the folding open of the depression and a beginning bulging of the U-shaped or top-hat shaped starting section 20 the front wall 2 is subjected to tensile stress as tension strut and offers further resistance against intrusion of a crash obstacle into the vehicle safety region.

The sixth embodiment according to FIGS. 7A-7D differs from the fourth embodiment only in that the front wall stubs 21 are arranged relative to the flanges 22, 23 of the starting section 20 with an offset V in the direction of the rear wall 3. This has the advantage that during an impact a two-stage deformation course results which effects increasing force maxima with increasing offset.

The seventh embodiment according to FIGS. 8A-8D differs form the third embodiment in that the starting section 20 only has one flange 22, 23 and thus the U-shaped starting section 20 has a less pronounced top-hat profile. A fixed connection occurs in this case between the first front wall section 5 and the shorter flange 22 or the second front wall section 6.

The eight and ninth embodiments according to the FIGS. 9A-9E and 10A-10D have changed starting profiles 20 compared to the preceding embodiments. The eight and ninth embodiments also are made of a rear wall 3, transverse walls 11, 12 and flanges 22, 23 that point away from each other. However, two inner transverse walls 13 and 14 which protrude substantially perpendicular from the rear wall 3, are arranged at a distance A from each other, wherein the inner transverse walls 13, 14 form a chamber OK which is open in the direction of the rear wall 3. The two inner transverse walls 13, 14 which delimit the open chamber OK are hereby connected by a connecting web 4, which contacts the front wall 2 as shown in FIGS. 9B and 10B, wherein the connecting web 4 is fixedly connected, in particular welded, to the front wall 2 of the impact beam 1. In addition the impact beam 1 has three multilayered front sections 9, 9', 9", wherein in the variant according to FIG. 9D a three-layered front wall section 9" is formed by the front wall sections 5, 6 together with the web 4, and in the region of the flanges 22, 23 of the starting section 20 a respective double-layered front wall section 9, 9' is formed. The fixed connection is again accomplished according to FIGS. 9C and 10C by means of welding seams S, according to FIGS. 9D and 10D by means of welding rivets N. As shown in FIG. 10A a predetermined folding site 25 is also formed in the starting section 21 as in the third embodiment.

FIGS. 11A-11D show a starting section 20 that is different from the embodiment according FIGS. 9A-9E, wherein in this case no flanges are formed but rather the front wall stubs 21 directly adjoin the two transverse walls 11, 12 and are bent so that together with a connecting web 4 two double-layered front wall sections 9 form approximately in the middle height of the impact beam 1 and two sub chambers HK1, HK2.

According to an eleventh embodiment according to FIGS. 12A-12D the connecting web 4 has in contrast to the tenth embodiment a trench-like bulge 26, which in cross section is oriented in the direction of the front wall 2, wherein the fixed connection with the front wall 2 is arranged in the region of the trench-shaped bulge 26.

Figure 13A:
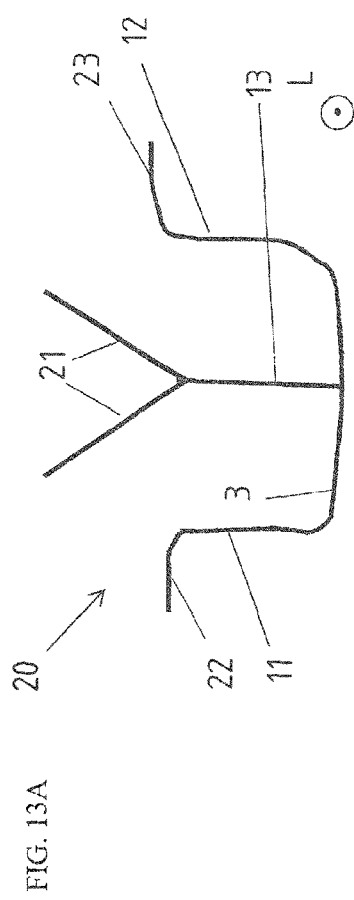
FIGS. 13A-13C show cross sectional views of another embodiment of the impact beam according to the invention taken along section I-I of FIG. 1A.
Figure 13B:
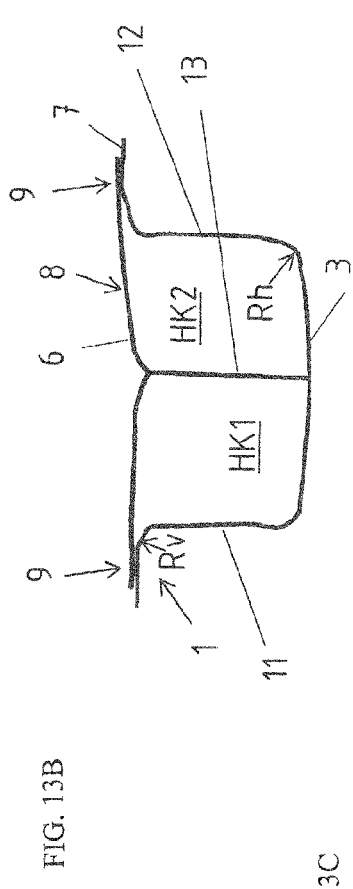
Figure 13C:
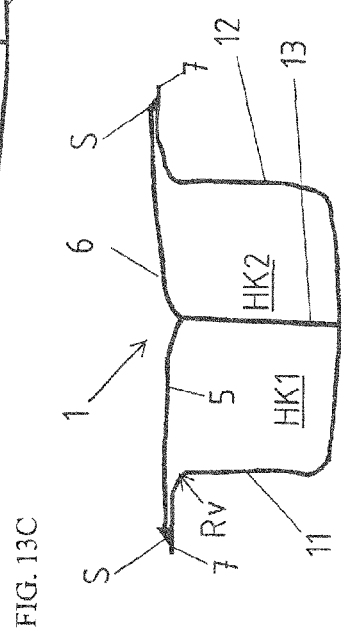

The twelfth embodiment of the impact beam 1 according to FIGS. 13A-13C substantially corresponds to the impact beam according to FIGS. 3A-3D with the following differences. FIG. 13A shows that the inner transverse wall 13 is formed Y-shaped in the open U-shaped starting section 20. The stem of the Y is formed by a vertically extending section of the transverse wall 13, which in the finished formed impact beam 1 forms the inner transverse wall 13. The branches extending from the Y in opposite directions form two front wall stubs and later two front wall section 5, 6. The flanges 22, 23 at the ends of the transverse walls 11, 12, which are formed on the starting section 20 and point away from each other, remain unchanged in the finished formed impact beam 1. Via a front wall curvature 15 with the front radius Rv the transverse wall 11 or 12 transitions into the flange 22 or 23. The transverse wall 11, 12 transitions into the rear wall 3 with a radius Rh.

As can be seen in FIG. 13B the front wall stubs 21 are bent over and after the forming are brought into contact with the ends of the transverse walls 11 and 12 or the flanges 22, 23 so as to be supported thereon. In FIG. 13C it can be seen that in the finished impact beam 1 the bent over front wall sections 5 and 6 are fastened on the front wall sections 7 or the flanges 22, 23 by means of the welding seam S or by means of a welding rivet. This results in a two-layered front wall section 9.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An impact beam for a motor vehicle, said impact beam comprising:
a front wall, a rear wall extending at least in sections parallel and at a distance to the front wall and at least two transverse walls which connect the front wall and the rear wall,
said front wall having a single-layered front wall section and a multilayered front wall section, said multilayered front wall section being formed by a first front wall section and a second front wall section, wherein the first front wall section is fixedly connected with the second front wall section, wherein at least the single-layered front wall section, the rear wall and the at least two transverse walls together enclose a hollow chamber,
said front wall, said rear wall and said transverse walls being configured in one-piece and of a same material, said rear wall and said transverse walls having a yield strength RP0.2 between 300 MPa and 550 MPa, said impact beam being made of a longitudinal starting section with a constant U-shaped cross section, wherein the U-shaped cross section of the starting section forms the rear wall and the at least two transverse walls of the impact beam at least in a longitudinal section of the impact beam.

2. The impact beam of claim 1, wherein between the single-layered front wall section and one of the at least two transverse walls adjoining the single layered front wall section a front wall curvature with a first radius is formed, and between the rear wall and another one of the at least two transverse walls a rear wall curvature with a second is formed, said second radius being smaller than the first radius by at least 20 percent.

3. The impact beam of claim 1, wherein the front wall has a third front wall section and wherein between the first front wall section and the third front wall section a front wall curvature with a first radius is formed and between the rear wall and one of the at least two transverse walls a rear wall curvature with a second radius is formed, said second radius being smaller than the first radius by at least 20 percent.

4. The impact beam of claim 1, wherein the starting section is an open extruded section, said front wall of the impact beam being made from a front wall stub of the starting section, wherein at least sections of the front wall of the impact beam have an increased wall thickness relative to a respective wall thickness of the at least two transverse walls.

5. The impact beam 1 of claim 1, wherein the starting section is an open extruded section having an opening, said opening being arranged on a side that facing away from the rear wall.

6. The impact beam of claim 1, wherein at least one of the front wall sections and/or a front wall curvature formed between the first front wall section and a third front wall section of the front wan has a yield strength RP0.2 between 150 and 300 MPa and/or a wall thickness smaller than or equal to 3 mm.

7. The impact beam of claim 1, further comprising an inner transverse wall protruding perpendicularly from the rear wall and dividing the hollow chamber into two sub chambers.

8. The impact beam of claim 7, wherein the front wall has two double layered sections and two single-layered sections and is formed by two front wall stubs which are connected with the inner transverse wall and together with the inner transverse wall form a Y-shaped configuration in the starting section when viewed in cross section, with the two front wall stubs forming branches of the Y-shaped configuration, wherein the two double layered sections and the two single layered sections are formed by folding the two front wall stubs away from each other in a direction of the at least two transverse walls.

9. The impact beam of claim 7, wherein the inner transverse wall is configured T-shaped in cross section, with at least one of the front wall sections being fastened on the inner transverse wall.

10. The impact beam of claim 7, characterized further comprising two inner transverse walls protruding perpendicularly from the rear wall at a distance to each other, and together with the front wall forming a chamber which is open in a direction of the rear wall.

* * * * *